(12) United States Patent
Fuerhapter et al.

(10) Patent No.: US 6,711,945 B2
(45) Date of Patent: Mar. 30, 2004

(54) METHOD FOR DETERMINING THE POSITION OF THE COMBUSTION

(75) Inventors: Alois Fuerhapter, Graz (AT); Eduard Unger, Leibnitz (AT); Bernhard Breitegger, Lieboch (AT)

(73) Assignee: AVL List GmbH, Graz (AT)

( * ) Notice: Subject to any disclaimer, the term of this patent is extended or adjusted under 35 U.S.C. 154(b) by 13 days.

(21) Appl. No.: 10/261,500

(22) Filed: Oct. 2, 2002

(65) Prior Publication Data

US 2003/0061869 A1 Apr. 3, 2003

(30) Foreign Application Priority Data

Oct. 2, 2001 (AT) .................... GM 755/2001 U

(51) Int. Cl.$^7$ .................................... G01L 3/26
(52) U.S. Cl. ........................................ 73/117.3
(58) Field of Search ...................... 73/116, 117.3, 73/35.08; 123/41.02

(56) References Cited

U.S. PATENT DOCUMENTS 5,608,161 A * 3/1997 Pischinger ............ 73/117.3
6,089,077 A * 7/2000 Daniels ................. 73/35.08
6,612,186 B1 * 9/2003 Patten et al. ........... 73/861.04

FOREIGN PATENT DOCUMENTS

| DE | 3833084 | 4/1989 |
|----|---------|--------|
| DE | 19705900 | 8/1998 |
| EP | 1106805 | 6/2001 |

OTHER PUBLICATIONS

U.S. patent application Ser. No. 10/291,855, Duvinage et al., filing date May 2003.*

* cited by examiner

*Primary Examiner*—Edward Lefkowitz
*Assistant Examiner*—Maurice Stevens
(74) *Attorney, Agent, or Firm*—Dykema Gossett PLLC

(57) ABSTRACT

The invention relates to a method for determining the position of the combustion in a combustion chamber of an internal combustion engine. In order to enable an early determination of the 50% mass conversion point it is provided that the maximum value of the heating progress of the combustion is determined, that the 50% mass conversion point is assigned in a temporal respect to the maximum value of the heating progress, and that the temporal assignment of the 50% mass conversion point to the maximum value of the heating progress occurs prior to the end of the combustion.

8 Claims, 2 Drawing Sheets

METHOD FOR DETERMINING THE POSITION OF THE COMBUSTION

BACKGROUND OF THE INVENTION

The invention relates to a method for determining the position of the combustion in the combustion chamber of an internal combustion machine.

For the purpose of controlling homogeneous gasoline engines, especially homogeneous auto-ignited internal combustion engines, as well as for controlling the combustion in homogeneous spark-ignited internal combustion engines it is necessary to provide a rapid detection of the combustion situation and thus the 50% mass conversion point (MFB—Mass Fraction Burnt), i.e. the time or the crank angle α at which half the fuel mass has been converted. For the purpose of a precise determination of the 50% mass conversion point from a cylinder pressure signal it is necessary to wait for the end of the combustion during the calculation and to then determine the integral over the heating progress $dQ/d\alpha$. This control input is thus available at a relatively late point in time for real-time controlling. Especially in the case of multiple-cylinder internal combustion engines this is too late for controlling the combustion of the next igniting cylinder. Moreover, tendencies from the position of the maximum cylinder pressure increase cannot be derived reliably.

DESCRIPTION OF THE PRIOR ART

DE 197 05 900 A1 describes a method for controlling the ignition point of an internal combustion engine, with the overall pressure progress being determined over the crank angle in the cylinder and said overall pressure progress being subdivided into four partial areas. The partial areas range from a crank angle of −180° up to an integration angle determined on the test stand, from said integration angle up to an upper dead center, from the upper dead center to the positive integration angle and from said angle up to the crank angle of 180°. The integration angle has a fixedly defined distance from the combustion center, which states the state in which half the fresh charge has been incinerated. In the ideal case which is independent from the speed and load, the ignition angle is situated at the location of the combustion pressure center. In this case, the first partial area resulting from the combustion pressure progress from the upper dead center to the integration angle corresponds to the second partial area resulting from the combustion pressure progress which reaches from the integration angle up to the crank angle. In order to take the speed- and load-dependence into account, the second partial area is multiplied with a speed- and load-dependent factor which is determined on the test stand. This method is relatively cumbersome and leads to the disadvantage that the information on the position of the 50% mass conversion point can also be provided only relatively late after the end of the combustion.

DE 38 33 084 A1 describes an apparatus for monitoring the ignition point in an internal combustion engine. The ignition point is monitored on the basis of at least the effective thermal value or the effective combustion value of the fuel on the basis of the in-cylinder pressure.

A combustion control device for an internal combustion engine is further known from EP 1 106 805 A1, in which the thermal value is also determined on the basis of the in-cylinder pressure and the crank angle in order to control the ignition point and the injection rate or the fuel injection timing.

In these known methods and apparatuses the entire combustion is detected at first and then the heating progress is evaluated with respect to form and position. The information on the position of the 50% mass conversion point and on the combustion can thus be provided here too only at a very late point in time.

SUMMARY OF THE INVENTION

It is the object of the present invention to avoid such disadvantages and to develop a method with which an early statement can be made on the position of the combustion, especially the 50% mass conversion point.

This is achieved in accordance with the invention is such a way that the maximum value of the heating progress of the combustion is determined, that the 50% mass conversion point is assigned in a temporal respect to the maximum value of the heating progress, and that the temporal assignment of the 50% mass conversion point to the maximum value of the heating progress occurs prior to the end of the combustion. It is preferably provided in this respect that the temporal assignment of the 50% mass conversion point to the maximum value of the heating progress $dQ/d\alpha$ is carried out between the occurrence of the maximum value of the heating progress $dQ/d\alpha$ and the end of the combustion. In this way the position of the combustion can be assigned at an exceptionally early point in time.

The invention makes use of the fact that in gasoline internal combustion engines typically there is only one marked maximum in the heating progress. Therefore, the position of the 50% mass conversion point can be determined according to the inventive method immediately after exceeding the maximum of the heating progress $dQ/d\alpha$. The invention is based on the finding that the maximum of the heating progress $dQ/d\alpha$ corresponds to a sufficiently precise extent to the position of the 50% mass conversion point. The position of the 50% mass conversion point is thus available as a control input at a very early time for controlling the combustion. The calculation efforts are minimal, since the integral of the heating progress $dQ/d\alpha$ does not have to be calculated.

The calculation of the heating progress can occur continuously. In a particularly simple high-precision embodiment it is provided that the heating progress is measured discontinuously, preferably in intervals of 1° of crank angle.

The heating progress $dQ/d\alpha$ is calculated by differentiation of the heat $Q_i$ to the angle value i according to crank angle α according to the following differentiation from the first main theorem of thermodynamics:

$$Q_i = \frac{K}{\kappa - 1}[\kappa \cdot p_i \cdot (V_{i+n} - V_{i-n}) + V_i \cdot (p_{i+n} - p_{i-n})]$$

In this equation, the references mean the following:
Q . . . heat,
n . . . detection interval (1° of crank angle)
κ . . . polytropic curve exponents
P . . . cylinder pressure
V . . . cylinder volume
K . . . constant A relevant advantage of the method in accordance with the invention is that tendencies of the 50% mass conversion point which are temporally assigned to the maximum of the heating progress $dQ/d\alpha$ coincide exceptionally well with the tendencies of the precisely determined 50% mass conversion point.

BRIEF DESCRIPTION OF THE DRAWINGS

The invention is now explained in closer detail by reference to the enclosed Figures, wherein.

DETAILED DESCRIPTION OF THE PREFERRED EMBODIMENT

Figure 1:
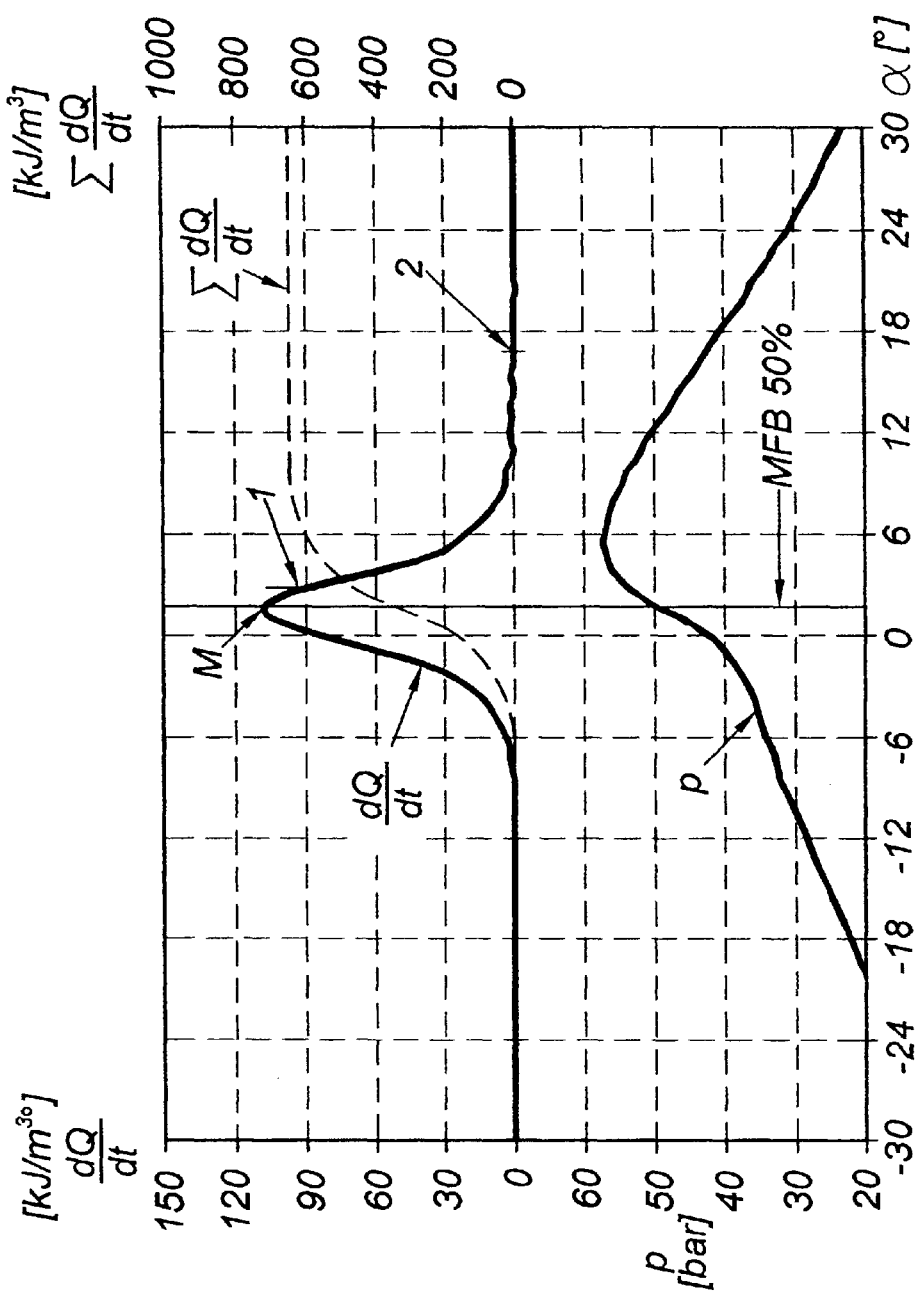
FIG. 1 shows the pressure progress and the heating progress dQ/dα entered over the crank angle.

FIG. 1 shows on the one hand the cylinder pressure p and on the other hand the heating progress dQ/dα as well as temporal integral ΣdQ/dαdα entered over the same.

Reference MFB50% shows the position of the 50% mass conversion point (mass fracture burnt). It can be seen that the position of the 50% mass conversion point MFB50% corresponds with a high amount of precision to the position of the maximum M of the heating progress dQ/dα. The method in accordance with the invention allows determining the 50% mass conversion point MFB50% already at the time designated with 1. If the 50% mass conversion point were calculated from the temporal integral from dQ/dα, then this could occur at the earliest only after the end of the combustion at the time designated with 2. In real engine operation it is necessary to assign a fixed angular value to point 2 at which the combustion has already ended under all circumstances. Since the end of the combustion depends very strongly on the operating state, it is necessary, in order to be on the safe side, to choose a far later and thus even more unfavorable point 2.

Figure 2:
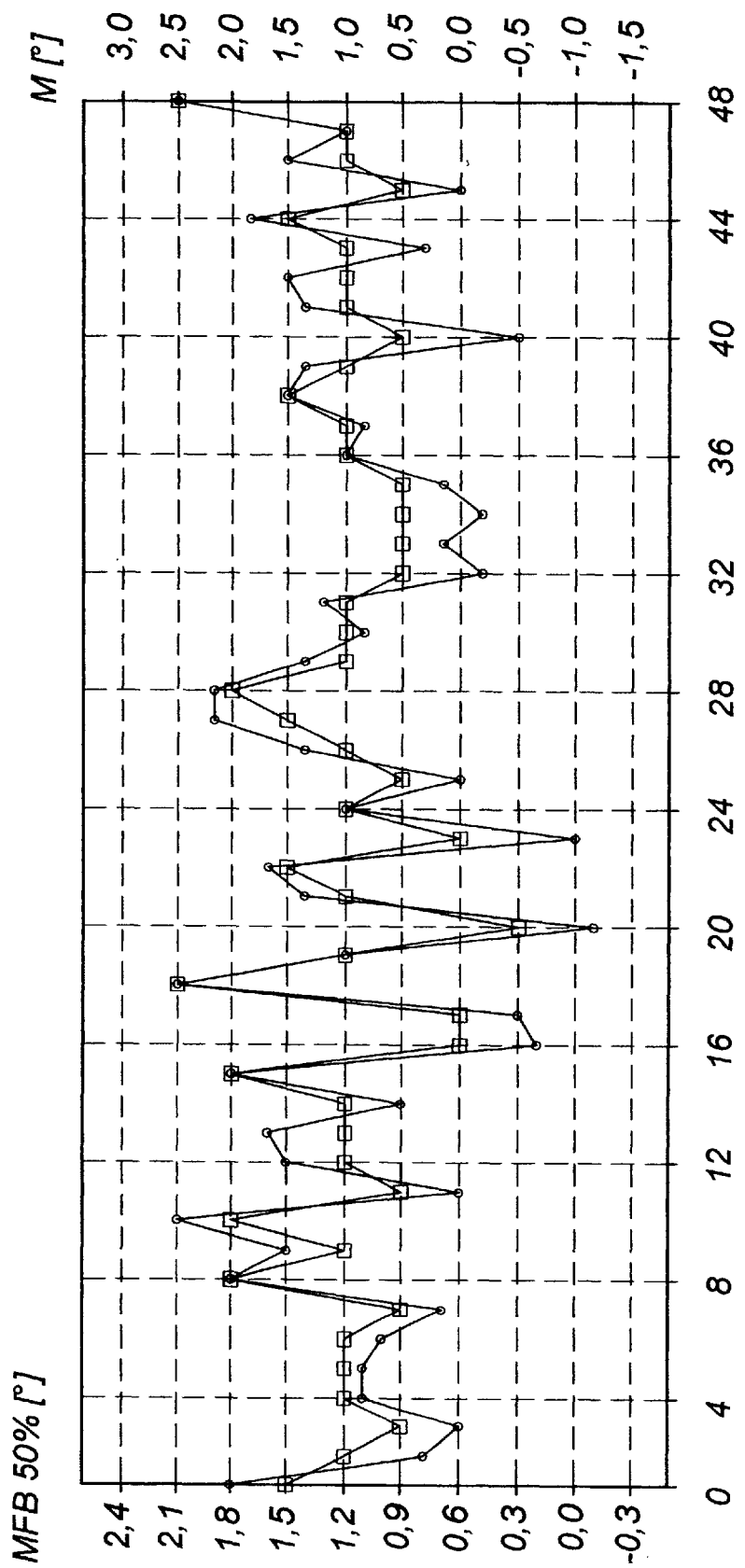
FIG. 2 shows the position of the 50% mass conversion point for successive engine cycles.

FIG. 2 shows a comparison between the 50% mass conversion point MFB50% and the maximum M of the heating progress dQ/dα over 48 successive engine cycles Z. It can be recognized finally that the tendencies of the maximum M of the heating progress dQ/dα coincide with the tendencies of the precisely determined 50% mass conversion point MFB50%.

The described method is especially suitable for combustion-guided engine control systems which use a combustion sensor, e.g. a combustion chamber pressure sensor.

What is claimed is:

1. A method for determining the position of a combustion in a combustion chamber of an internal combustion engine, wherein a maximum value of a heating progress of the combustion is determined, the 50% mass conversion point is assigned in a temporal respect to the maximum value of the heating progress, and the temporal assignment of the 50% mass conversion point to the maximum value of the heating progress occurs prior to the end of the combustion.

2. A method according to claim 1, wherein the temporal assignment of the 50% mass conversion point to the maximum value of the heating progress is carried out between the occurrence of the maximum value of the heating progress and the end of the combustion.

3. A method according to claim 1, wherein the heating progress is determined continuously.

4. A method according to claim 1, wherein the heating progress is determined discontinuously.

5. A method according to claim 4, wherein the heating progress is determined in intervals of 1° of crank angle.

6. A method according to claim 1, with a cylinder pressure being measured at least during the combustion, wherein the heating progress is determined on a basis of the measured cylinder pressure according to an equation for a heat:

$$Q_i = \frac{K}{\kappa - 1}[\kappa \cdot p_i \cdot (V_{i+n} - V_{i-n}) + V_i \cdot (p_{i+n} - p_{i-n})],$$

with $Q_i$ being the heat to the angular value i, n a detection interval, κ a polytropic curve exponent, p the cylinder pressure, V a cylinder volume and K a constant.

7. A method according to claim 1, wherein the internal combustion engine is operated homogeneously with gasoline as fuel.

8. A method according to claim 1, wherein the internal combustion engine is operated in an auto-ignited manner.

* * * * *